US012063200B2

(12) United States Patent
Woodberg et al.

(10) Patent No.: US 12,063,200 B2
(45) Date of Patent: Aug. 13, 2024

(54) SYSTEMS AND METHODS FOR SENSOR TRUSTWORTHINESS

(71) Applicant: Proofpoint, Inc., Sunnyvale, CA (US)

(72) Inventors: Bradley Scott Woodberg, Plymouth, MI (US); Doyle Joseph Groves, Noblesville, IN (US)

(73) Assignee: Proofpoint, Inc., Sunnyvale, CA (US)

( * ) Notice: Subject to any disclaimer, the term of this patent is extended or adjusted under 35 U.S.C. 154(b) by 280 days.

(21) Appl. No.: 17/213,673

(22) Filed: Mar. 26, 2021

(65) Prior Publication Data
US 2022/0239634 A1   Jul. 28, 2022

Related U.S. Application Data

(60) Provisional application No. 63/141,783, filed on Jan. 26, 2021.

(51) Int. Cl.
*H04L 9/40* (2022.01)
*H04W 12/60* (2021.01)

(52) U.S. Cl.
CPC ........ *H04L 63/0236* (2013.01); *H04L 63/123* (2013.01); *H04L 63/126* (2013.01); *H04L 63/1408* (2013.01); *H04W 12/66* (2021.01)

(58) Field of Classification Search
CPC . H04L 63/0236; H04L 63/123; H04L 63/126; H04L 63/1408; H04W 12/66
USPC .......................................................... 726/11
See application file for complete search history.

(56) References Cited

U.S. PATENT DOCUMENTS

| 10,749,893 B1* | 8/2020 | Dahlberg ............. G06Q 10/067 |
| 2009/0089859 A1 | 4/2009 | Cook |
| 2010/0080145 A1* | 4/2010 | Frietsch ................. H04L 41/12 370/254 |

(Continued)

FOREIGN PATENT DOCUMENTS

CN          110572822 B  *  9/2022  .......... H04W 12/009

OTHER PUBLICATIONS

Extended European Search Report for Application No. 21177873.3, mailed Nov. 5, 2021, 8 pgs.

(Continued)

*Primary Examiner* — Lynn D Feild
*Assistant Examiner* — Saad Ahmad Abdullah
(74) *Attorney, Agent, or Firm* — Sprinkle IP Law Group

(57) ABSTRACT

Systems, methods and products for determining the trustworthiness of anonymous sensors, including a sensor health check, a data ballpark check, a reputation comparison, and optional "last resort" procedures. The sensor health check examines sensor operating parameters to see if they fall within an envelope of expected values. If not, the sensor is unhealthy and is not trusted. The data ballpark check determines whether the sensor's traffic data falls within a predefined envelope of values. If the sensor is healthy and the traffic is within expected ranges, the sensor is trusted. If the traffic data is outside expected ranges, the reputation comparison, determines whether IP addresses, domains or other IOCs in the traffic data are found in the reputation list which may corroborate the traffic as trustworthy because it represents malicious or not-in-the-wild traffic. "Last resort" procedures may include applying safelists/blocklists, signature controls etc. to verify sensor/data trustworthiness.

20 Claims, 5 Drawing Sheets

(56) References Cited

U.S. PATENT DOCUMENTS

| | | | |
|---|---|---|---|
| 2016/0028750 A1* | 1/2016 | Di Pietro | H04W 12/125 |
| | | | 726/23 |
| 2016/0285904 A1* | 9/2016 | Ye | H04L 63/1425 |
| 2018/0007087 A1* | 1/2018 | Grady | G06F 21/554 |
| 2018/0020002 A1* | 1/2018 | Duca | H04L 63/0236 |
| 2018/0152468 A1* | 5/2018 | Nor | H04L 43/045 |
| 2018/0351977 A1* | 12/2018 | Carothers | G06F 21/552 |
| 2021/0005332 A1* | 1/2021 | D'Angio | H04L 67/12 |
| 2021/0051751 A1* | 2/2021 | Pawar | H04L 67/12 |

OTHER PUBLICATIONS

Sandeep Yadav et al., "Detecting algorithmically generated malicious domain names", Proceedings of the 10th Annual Conf. on Internet Measurement, IMC '10, ACM Press, New York, NY, Nov. 1, 2010, pp. 48-61.

Pawan Prakash et al., "PhishNet: Predictive Blacklisting to Detect Phishing Attacks," Infocom, 2010 Proceedings IEEE, Piscataway, NJ, Mar. 14, 2014, pp. 1-5.

\* cited by examiner

SYSTEMS AND METHODS FOR SENSOR TRUSTWORTHINESS

RELATED APPLICATIONS

This application claims priority under 35 U.S.C. § 119(e) to U.S. Provisional Application No. 63/141,783, entitled "Systems and Methods for Sensor Trustworthiness", filed Jan. 26, 2021, which is fully incorporated herein by reference for all purposes.

FIELD OF THE INVENTION

Embodiments of the present invention relate generally to cyberthreat security systems, and more particularly to systems and methods for determining whether anonymized cyberthreat sensors and the data generated by these sensors is trustworthy.

BACKGROUND

Today's cybersecurity engineers need timely and accurate data about imminent threats and how they spread around the globe. With this data, cybersecurity researchers and analysts can improve the detection of malicious network traffic. The times when people could rely on just firewall rules for our protection are long gone. Additional layers of security are desperately needed to guard against these attacks.

Threat detection data (threat intelligence) is needed by cyberthreat security companies to identify threats so that they can help customers to protect themselves from these threats. Threat detection data can be obtained from various sources. In some cases, the data can be obtained from a network of sensors of known customers. These sensors generate alerts that are communicated to a threat intelligence product, which can then analyze the data. When there appear to be problems the received data, the customers can be contacted to verify that the data is trustworthy. Threat intelligence may also be collected from sources that are anonymous. If there is a problem with this data, however, the source of the anonymous data is unknown, so the cybersecurity company cannot contact the source to verify the trustworthiness of the data. It would therefore be desirable to provide systems and methods to determine whether this cyberthreat data is trustworthy.

SUMMARY OF THE DISCLOSURE

Embodiments disclosed herein are designed to ensure that data received from network sensors is trustworthy. In these embodiments, an emerging threat product receives network sensor data from anonymous third parties that sign up to use the product in exchange for anonymously providing sensor telemetry data. In this model, if anomalous data comes in, the cybersecurity company (and product) has no access to the sensor owners for verification of the sensors' trustworthiness. An automated mechanism is therefore provided to verify that sensor data is trustworthy, so that the product does not condemn domains, IP addresses, etc. based on untrustworthy data. The product thereby avoids having good domains, etc. identified as "bad", which might cause them to be improperly blocked, taken down, etc.

In the present embodiments, since the sensor owner is not known, available information on a sensor itself and its telemetry data are examined to determine their trustworthiness. These embodiments use a combination of phases to determine sensor/data trustworthiness. Phase 1 uses a set of criteria to determine if the sensor itself is operating within an envelope of parameters that are associated with normal, trustworthy operation. In other words, this phase examines the sensor to determine whether it is up-to-date and appears to be operating correctly. If not, the sensor is deemed untrustworthy. If the sensor appears to be operating correctly, Phase 2 examines the generated sensor data to determine if the data falls in a trustworthy range. If the sensor data passes the phase 2 check, the sensor and data are deemed trustworthy. If not, Phase 3 reviews "suspect" sensor data against a larger IP reputation database to corroborate the reputation associated with the reported IP address, domains, SSL certificates, or other indicators of compromise (IOCs). If the reputation of the reported IP address is corroborated, the data is trusted for at least a current evaluation cycle. Finally, if Phases 1-3 do not determine whether a sensor and/or its data are trustworthy, existing protections and tools for determining trustworthiness (e.g., safelists/blocklists, signature controls, customer feedback) may serve as a Phase 4 of the process.

One embodiment comprises a method that includes three phases. After sensor data including sensor operating parameters and traffic data is received from an anonymous sensor, a first phase is performed in which it is determined whether the sensor operating parameters fall within a predefined envelope of expected operating parameters. If it is determined that the sensor operating parameters fall outside the predefined envelope of expected operating parameters, the sensor is designated as an untrusted sensor (e.g., an indication of the sensor is stored in a list of untrusted sensors). If, on the other hand, it is determined that the sensor operating parameters fall within the predefined envelope of expected operating parameters, the method proceeds to a second phase in which it is determined whether the traffic data of the sensor falls within a predefined envelope of expected traffic data. If it is determined that the traffic data of the sensor falls within the predefined envelope of expected traffic data, the sensor is designated as a trusted sensor, and the method may terminate (although it should be noted that the method may be repeated on a periodic, e.g. daily, basis).

If it is determined that the traffic data of the sensor falls outside the predefined envelope of expected traffic data, a third phase of the method is performed. In this phase, a first set of IP addresses that are identified in the traffic data as being associated with alerts or other indications that they are bad IP addresses are compared to a second set of IP addresses that are contained in a reputation list. This second set of IP addresses have previously been designated as having bad reputations. If it is determined that the first set of IP addresses in the traffic data is corroborated by the second set of IP addresses in the reputation list (e.g., a predetermined percentage of the addresses indicated as bad in the sensor data are also indicated as bad in the reputation list), the sensor's data is trustworthy, and the sensor is designated as a trusted sensor.

If during the third phase the first set of IP addresses in the traffic data are not corroborated by the second set of IP addresses in the reputation list, an optional fourth phase may be performed. In the fourth phase, the traffic data of the sensor is forwarded to a user who performs a manual evaluation of the traffic data of the sensor to determine whether the sensor is trustworthy. This evaluation may involve conventional procedures, such as comparison of IP addresses reported in the sensor traffic to existing safelists/blocklists which prevent known non-malicious services from being assigned malicious reputation, ensuring that malicious reputation is only applied based on certain signatures, allowing administrative users to blacklist sensors, analyzing IP addresses based on customer reports of false positives, etc.

The traffic data received from trusted sensors is forwarded to an analysis system for evaluation, and traffic data received from untrusted sensors is discarded or otherwise removed from consideration by the evaluation system so that it does not "poison" the analysis of the aggregated data received from the trustworthy sensors. The method is repeated multiple times for the sensor (e.g., at designated intervals, or subsequent to performing the method with respect to the remainder of a set of sensors from which data has been received).

In some embodiments, determining whether the sensor operating parameters fall within the predefined envelope of expected operating parameters may include, for example, determining whether software running on the sensor has been updated within a predetermined preceding time period, determining whether at least a predetermined number of telemetry pings have been received from the sensor, determining whether an average time between telemetry pings is no more than a predetermined amount of time, determining whether an average propagation delay for telemetry pings is no more than a predetermined delay, determining whether a network threat detection engine is running, and an average volume of sensor data traffic is at least a minimum volume.

In some embodiments, determining whether the traffic data of the sensor falls within the predefined envelope of expected traffic data may include, for example, determining whether a rate of sensor alerts generated by the sensor per unit of traffic falls within a predetermined range, determining whether a number of IP addresses per unit of traffic falls within a predetermined range, determining whether a number of unique session IDs per unit of traffic falls within a predetermined range, etc.

One alternative embodiment comprises a system having a processor coupled to a memory, where the memory stores instructions which are executable by the processor to perform a method as described above. Another alternative embodiment is a computer program product comprising a non-transitory computer-readable medium storing instructions executable by one or more processors to perform a method as described above.

Embodiments disclosed herein may provide a number of advantages over the prior art. For example, the disclosed embodiments enable determination of the trustworthiness of anonymous sensors, avoiding the necessity in conventional systems that the recipient of sensor data be able to verify the trustworthiness of the sensor with a known owner of the sensor. Further, the disclosed embodiments enable the trustworthiness of sensors to be determined based on objective data received directly from the sensors themselves rather than requiring reliance on indirect information regarding trustworthiness from the sensors' owners. The disclosed embodiments also enable the owners of sensors to remain anonymous while still providing sensor data to a recipient that can utilize the anonymized data for evaluation of potential threats. Still other advantages may be apparent to persons skilled in the art.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
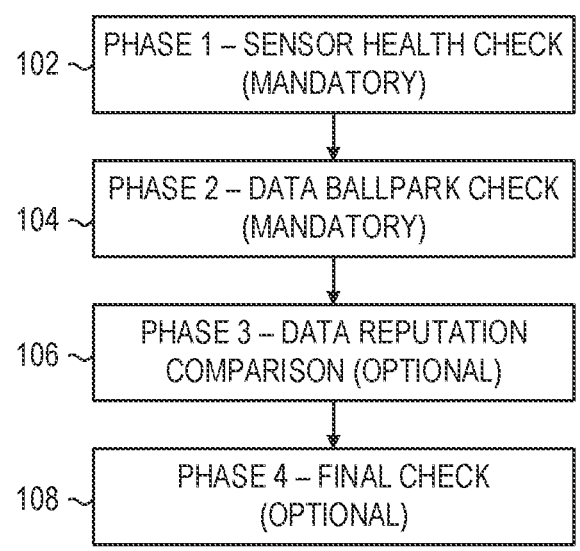
FIG. 1 is a high level flow diagram illustrating a method for determining the trustworthiness of anonymous sensors in accordance with some embodiments.

The disclosure and various features and advantageous details thereof are explained more fully with reference to the exemplary, and therefore non-limiting, embodiments illustrated in the accompanying drawings and detailed in the following description (including Appendix A). It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

The need for valuable threat detection data and the increasing importance of additional network security highlights the need for embodiments of the systems and methods disclosed herein for obtaining emerging threat telemetry. In order to obtain this telemetry, a cyberthreat security company may obtain data from a number of different sources. These sources may include information from within the ecosystem of the cyberthreat security company (email, cloud, social and mobile sources, internal threat researchers, etc.), sandboxed detonation of malware, threats discovered from other vectors that the company protects, and external sensors that detect events triggered by an IP address, and the like. Embodiments disclosed herein concern the information that is detected, and the event alerts that are generated by these sensors.

Emerging threat sensor data may be obtained, for example, by offering customers free access and use of emerging threat rulesets in exchange for anonymized information about detected threats. While open rulesets may be available, specialized cyberthreat security companies may develop emerging threat rulesets that can cover many different categories of network behaviors, such as malware command and control, DoS attacks, botnets, informational events, exploits, vulnerabilities, SCADA network protocols, exploit kit activity, etc. These emerging threat rulesets may be updated may frequently (e.g., daily) than available open rulesets.

Emerging threat rulesets are run on an enterprise's network and are used by cyberthreat security systems to detect malicious activity. More specifically, the system uses the ruleset to determine whether a potential threat matches a pattern identified by the ruleset. Thus, for instance, if a machine is infected with ransomware and it attempts to establish a connection out from the machine, this may be detected by a pattern that was written to look specifically for this activity. If this specific pattern is detected, the system generates an alert.

In an example threat intelligence product, intelligence (information about the threat) is collected from a number of different sources. One source of information results from the detonation of malware. "Detonate" is used here to refer to the process of triggering a URL, file attachment or other payload in an isolated, "sandboxed" environment and analyzing the resulting behavior (e.g., determining from the identified behavior whether the URL, file attachment or other payload is malicious).

Threat intelligence may also be collected from a network of sensors. When one of these sensors observes an action by a threat (a bad actor), an alert is generated and communicated to the threat intelligence product. These network sensors may include enterprises, ISPs (Internet service providers), universities, etc., and may be deployed all over the world. An exemplary network of sensors may be developed, for example, by providing the threat intelligence product to various customers who own or control the sensors, and collecting alert information and other telemetry generated by the threat intelligence product. In some cases, the threat intelligence product may be provided in exchange for the generated sensor telemetry. Because the telemetry that is collected in this manner is collected from known entities (and known sensors), telemetry from these sensors is normally trusted by the cyberthreat security company. Because this model requires that relationships be developed between the sources of the threat data and the cyberthreat security company, it requires a great deal of resources and is not easily scalable.

As an alternative, cyberthreat sensor data may be obtained by offering customers free access and use of emerging threat rulesets in exchange for anonymized information about detected threats. For instance, a person or enterprise can go to the cyberthreat security company's website and sign up to obtain the company's commercial cyberthreat security product. The cyberthreat security product may provide emerging threat rulesets that can cover many different categories of network behaviors, such as malware command and control, DoS attacks, botnets, informational events, exploits, vulnerabilities, SCADA network protocols, exploit kit activity, etc. While open rulesets may be available, these emerging threat rulesets may be preferred because they are more thorough, more advanced, updated may frequently (e.g., daily), or have other advantages over available open rulesets.

The customer may, rather than paying for the product, make a simple selection (e.g., checking an appropriate box) when obtaining the product, the selection indicating the customer's agreement to obtain the product for free in exchange for the cyberthreat telemetry generated by the product when operated by the customer.

While this arrangement is beneficial in that it provides a great deal of information to the cyberthreat security company, it presents a problem. In the legacy model in which the cyberthreat security company knows the customer, if strange data is received from one of the sensors associated with the customer, the company can contact the customer to determine the cause of the strange data and to determine whether or not the sensor and the data can be trusted.

In the model in which the customer provides anonymized data in exchange for free use of the cyberthreat security product, the company does not know the source of the data because it is, by design, anonymous. When strange data is received, the company simply contact the customer to determine whether the sensor and/or data is trustworthy.

In this case, untrustworthy data may result from several different circumstances. For example, one thing that might happen is that a malicious actor may intentionally try to poison the data. Another circumstance which is relatively common is that a person might not be trying to do anything malicious at all, but may be running the cyberthreat security product in a lab context or similar environment. While this is not a malicious activity, it is essentially manufactured data and not representative of a real-world situation (i.e., it is not "in-the-wild" data).

If the received sensor data is not trustworthy (whether for malicious reasons or not), the cyberthreat security system is adversely affected. Because the system is designed to produce output that customers rely upon in making decisions on whether to block content or not, if the data is poisoned, it could make benign events or activities look bad (although the converse—that the bad data could make bad events look good—is not normally true). If one cyberthreat security company publish that a particular domain is bad, then other entities may make decisions—typically automated—that effectively follow suit and block this domain. Then, a broader set of issues arise. Aside from the false positives (FPs) and other events that people might have to resolve, the product itself isn't as valuable because the signal-to-noise ratio is upset, which could have a big impact downstream. It is therefore desirable to be able to determine whether data is trustworthy without knowing the source of the data and without being able to contact the source, so that untrustworthy data (whether maliciously generated or not) can be excluded from analysis.

FIG. 1 is a flow diagram illustrating a method for determining the trustworthiness of anonymous sensors in accordance with some embodiments. This method includes four phases: a sensor health check phase, a data ballpark check phase, a data reputation comparison phase, and a final check phase. In the first phase (102), the sensor is checked to determine whether the sensor is properly programmed and is operating in a way which indicates that it is "healthy." For example, the age of the software and rule sets being used by the sensor are checked to be sure that they are up-to-date (e.g., they have been updated within a predetermined amount of time preceding the sensor health check). The sensor may also be checked to ensure that it is providing information as expected (e.g., there have been at least a minimum number of telemetry pings, the average time between telemetry pings is less than a threshold time, and the average data propagation delay is less than a predetermined maximum). The sensor may further be checked to ensure that the sensor is generating data as expected (e.g., the average data traffic is above a predetermined minimum, and the rate of generated alerts is within a predetermined order of magnitude of the detected sensor events).

If the sensor passes these sensor checks, the sensor is deemed to be operating properly (i.e., it is "healthy") and may be trustworthy (pending the subsequent checks described herein). If the sensor fails these sensor checks, it is deemed not to be "healthy". The sensor is therefore considered untrustworthy. The sensor health check may be performed when the system first begins receiving data from the sensor, and may be repeated on an ongoing basis.

If the sensor passes the sensor health check (102), the method proceeds to a second phase (104) the data traffic monitored by the sensor is checked to make sure that it is within an expected "ballpark". In other words, the data is checked to determine whether it falls within expected ranges. Data which is monitored "in the wild" normally has particular characteristics that may be defined by ranges of values for particular characteristics. If the data does not fall within the expected ranges, it may be an indication that the sensor is not detecting data "in the wild", but is instead generating data in a lab environment, or has been poisoned by a malicious actor. Thus, in the data ballpark check, the sensor data is examined to determine whether it falls within the expected ranges, rather than at the extreme ends of the respective distributions of values. The range of expected values may be relatively broad, as some sensors may be very busy, while others are less so. If the sensor passes the data ballpark check (104) as well as the sensor health check, the sensor is deemed to be trustworthy. Data from the sensor may therefore be collected for analysis. (In some embodiments, data may be collected during the sensor health and data ballpark checks, but if the sensor is determined to be untrustworthy, the data collected during these checks will be discarded.)

If the sensor fails the data ballpark check (104), the method proceeds to the third phase (106). In this phase, even though the sensor data failed the ballpark check, it may still be trustworthy since, for example, the data may accurately reflect monitored traffic associated with a malicious domain or IP address and may therefore have unusual patterns. In order to determine whether this is the case, IP addresses or domains which are reported by the sensor are compared to malicious IP addresses or domains contained in a reputation list. If it is determined that the IP addresses or domains corresponding to alerts in the monitored traffic are corroborated (i.e., at least a predetermined percentage of the IP addresses or domains reported in a particular category of reputation are matched to corresponding IP addresses or domains in the reputation list in the corresponding category), the data may be considered trustworthy even though the data ballpark check was failed.

If the data reported by the sensor cannot be corroborated by the reputation comparison, the method proceeds to a fourth phase (108) in which the sensor and corresponding data are subject to a manual review by an analyst or other administrative user of the system. This user would use more conventional procedures (e.g., safelists/blocklists, blacklists, signature control, customer reported false positives, etc.) to determine whether or not the data is trustworthy. Based on the results of the manual review, the sensor and its reported data may determine to be either trustworthy or untrustworthy.

Figure 2:
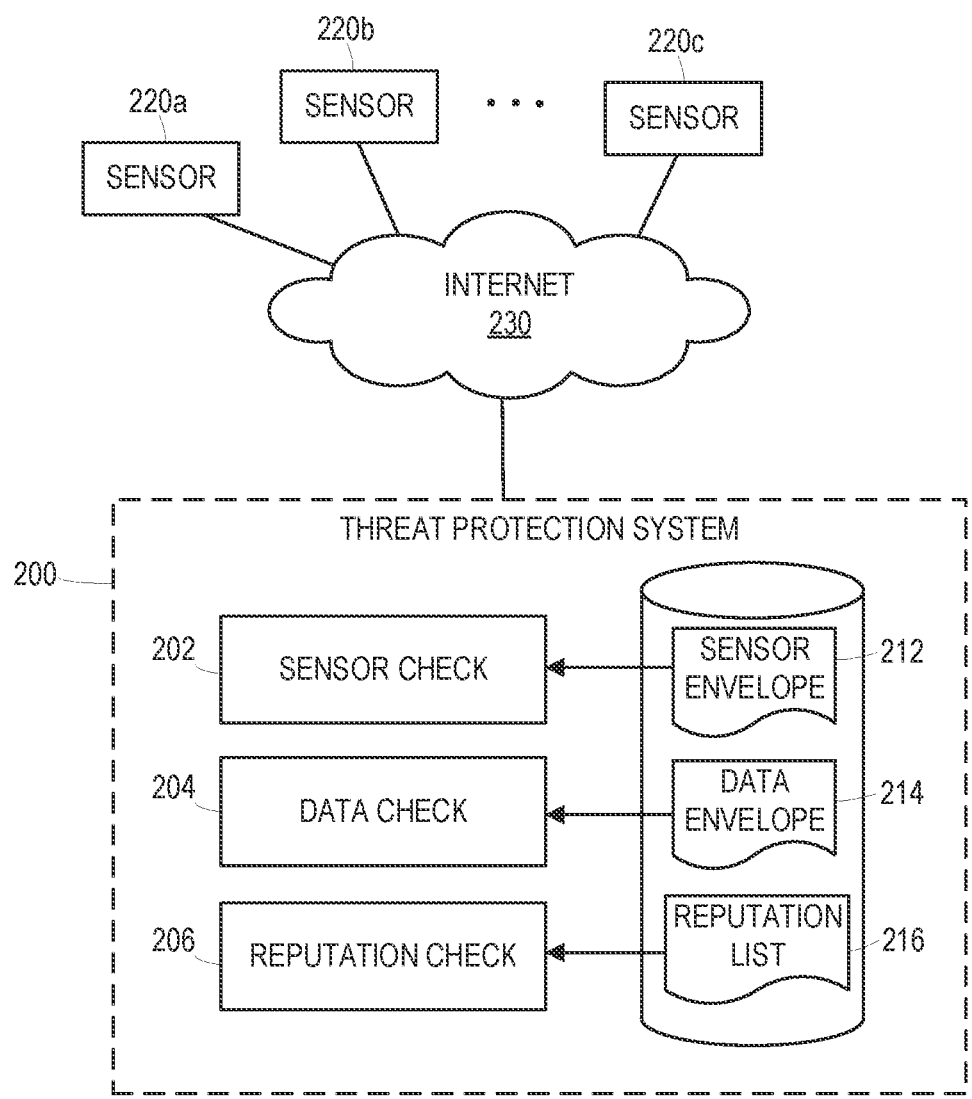
FIG. 2 is a diagram illustrating a threat protection system capable of operating in a network computing environment to determine the trustworthiness of sensors according to some embodiments.

FIG. 2 is a diagram illustrating a threat protection system capable of operating in a network computing environment to determine the trustworthiness of sensors according to some embodiments. The illustrated structure of the threat protection system is intended merely to serve as an example, and alternative embodiments that have different structures may also be suitable to implement the forensics-based clustering techniques disclosed herein.

Referring to FIG. 2, a threat protection system 200 is communicatively coupled to a set of sensors 220 (collectively referring to all of sensors 220a-220c) through a network 230 such as the Internet. Threat protection system 200 does not have specific identifying information for a sensors 220, but instead receives data from the sensors anonymously. Consequently, when data is received by the threat protection system from any of sensors 220, the threat protection system cannot identify which of the sensors provided the data (although sufficient information is provided to enable the threat protection system to determine that information received at different times may be from a specific one of sensors 220).

Threat protection system 200 includes several different modules, each of which is configured to perform a different phase of the inventive methods disclosed herein. It should be noted that, in alternative embodiments, the functionality of each of these modules may be redistributed (e.g., combined into fewer modules or redistributed into different modules), while still performing the same functions described herein. The functions of these modules will be described with respect to a particular one of sensors 220. As noted above, the data received from the particular one of the sensors is anonymized, so that threat protection system 200 can determine that the data comes from a specific one of the sensors (and that other, related data also comes from the same sensor), but cannot determine the owner of the sensor.

In the embodiment of FIG. 2, sensor check module 202 is configured to perform the first phase of the inventive method, in which information from the sensor is examined to determine the sensor's "health." In other words, sensor check module 202 examines information about the operation of the sensor, such as the number of telemetry pings, the time between telemetry pings, the data propagation delay of the sensor, the ages of the rule set and software installed on the sensor, and the like. This information for the particular sensor is compared to a set of criteria 212 which define whether or not the sensor is "healthy."

An example of the sensor criteria is shown in Table 1 below. In this case, the criteria include requirements for telemetry pings, time between telemetry pings, data propagation delay, rule set age, software age, Suricata (network threat detection engine) age, Suricata status, alert rate versus IDS event rate receipt, and decoder bytes (traffic). It should be noted that these parameters may be different in alternative embodiments, and may be configurable by the threat protection system. Sensor check module 202 will check each of these parameters to determine whether the corresponding criteria are met by the sensor. For example, the threat protection system must have received at least some minimum number of telemetry pings from the sensor, and the time between these telemetry pains must average less than a designated interval with no more than a predetermined average data propagation delay. Sensor check module 202 will also check to determine that the software and rule set installed on the sensor are up-to-date, determining whether the age of the rule set, the software, and the Suricata platform are each less than specified numbers of days. Sensor check module 202 also checks to ensure that the alert rate is within some number of orders of magnitude of the IDS event receipt rate. Module 202 further checks to ensure that the traffic of the sensor averages greater than a predetermined minimum threshold.

TABLE 1

| | |
|---|---|
| telemetry pings | at least_(number) |
| time between telemetry pings | average less than_hours |
| data propagation delay | average less than_seconds |
| ruleset age | average less than_days |
| software age | average less than_days |
| Suricata age | average less than_days |
| recent reputation on reporter IP | none |

TABLE 1-continued

| Suricata status | running |
|---|---|
| alert rate vs IDS event receipt rate | within_orders of magnitude |
| decoder bytes | average greater than_MB/hr |

If the information for the particular sensor meets the defined health requirements, then the sensor is deemed to be healthy and operating properly. The sensor health check may be performed a single time to verify the health of the sensor, or it may be performed on a continuing basis (e.g., periodically) according to a configurable schedule. The threat protection system may be configured to collect data from the sensor for the systems learning process, or the system may use data received during the trustworthiness verification process only for this process, and may delay data collection for general use until after the trustworthiness of the sensor has been verified. If the sensor fails to meet the sensor health check of module 202, the sensor is deemed to be untrustworthy, and data from the sensor is not used in the learning process of the threat protection system. If the sensor meets the criteria applied by sensor check module 202, the sensor is deemed to be healthy, and the trustworthiness verification process proceeds to phase 2.

Phase 2 is performed in this embodiment by data check module 204. In this phase, data check module 204 retrieves criteria 214 which identify the boundaries of a data envelope for the data that would normally be sent by a sensor to the threat protection system. These criteria provide rules for determining whether the sensor is sending data that looks like the data normally sent by a good sensor. These criteria may include a number of different parameters, and may be configurable by the threat protection system.

The data check criteria are determined based on analyses of trusted data. In the case of detected IDS events, for example, these analyses show that, although there is a great deal of variation in the number of events detected by different sensors, the difference between normal and malicious data traffic may in some cases be apparent without extensive analysis. For instance, metrics such as the ratios of traffic to alerts may be used to determine if the sensor is operating normally. Consider, for example, the data represented in Tables 2 and 3 below. Table 2 shows that the ratio of traffic to alerts for "normal" sensor traffic is approximately $7.8 \times 10^8$. By contrast, Table 3 shows that the ratio of traffic to alerts for one sensor is $1.3 \times 10^6$—a difference of more than two orders of magnitude. This indicates that the sensor represented by Table 3 is malicious.

Table 2

("normal" traffic)

| Counter | TM Name | Value |
|---|---|---|
| capture.kernel_pkts | Total | 2628176 |
| decoder.pkts | Total | 2633137 |
| decoder bytes | Total | 1558506918 |
| * * * | * * * | * * * |
| detect. alert | Total | 2 |

Ratio: 779,253,459 (decoder bytes/alert)

TABLE 3

(malicious traffic)

| Counter | TM Name | Value |
|---|---|---|
| capture.kernel_pkts | Total | 19154 |
| decoder.pkts | Total | 19154 |
| decoder bytes | Total | 15971757 |
| * * * | * * * | * * * |
| detect.alert | Total | 12 |

Ratio: 1,330,979 (decoder bytes/alert)

Figure 3A:
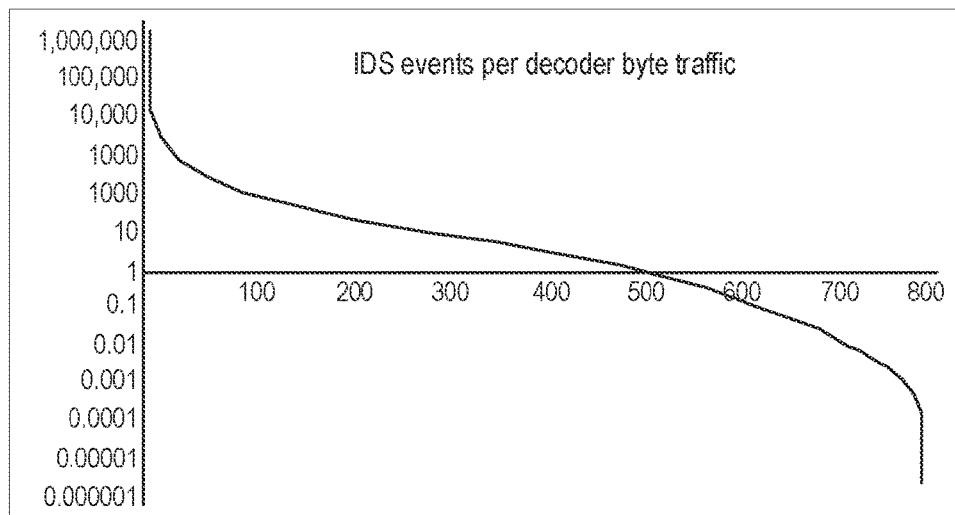
FIGS. 3A-3C are graphs illustrating examples of sensor data distributions in accordance with some embodiments.
Figure 3B:
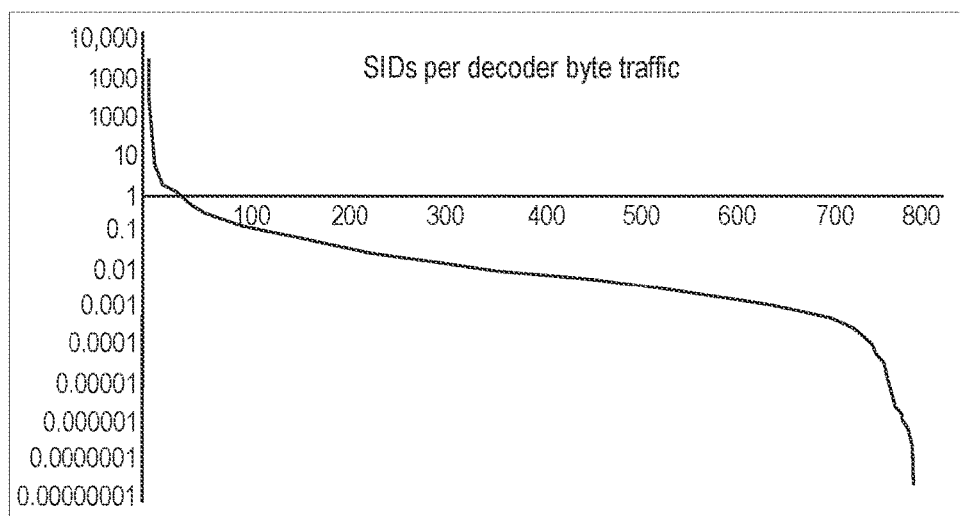
Figure 3C:
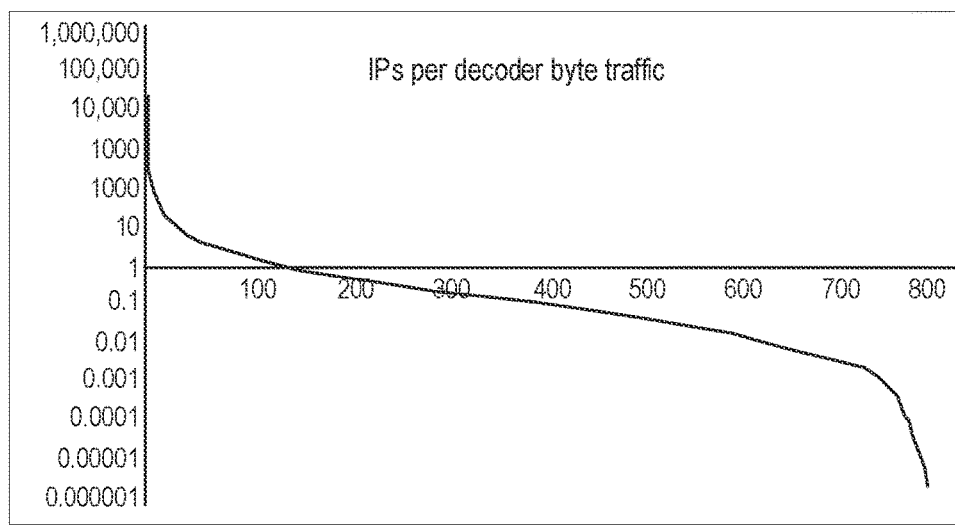

When the data for all of the available sensors in the network is viewed, the ratio of IDS events to traffic across the sensors has a distribution that may be characterized as "double-tailed". Examples are shown in FIGS. 3A-3C. It can be seen that this distribution has a roughly linear portion at the center of the distribution, and a tail on each end of the distribution, where the tail has a rapidly increasing or decreasing slope. Generally speaking, if the data from a sensor falls within the middle, generally linear portion of this distribution, it is considered to be normal, but if the data is at one of the tails of the distribution, it indicates that the data is not normal, and may not be trustworthy. In some embodiments, thresholds may be identified near each tail of the distribution, so that if the data falls below the lower threshold, or rises above the upper threshold, the sensor may fail the data check of phase 2. Similar distributions may be used to identify the "normal" data distributions for parameters such as IDS events per decoder byte traffic, unique SID's per decoder byte traffic, IP's per decoder byte traffic, etc.

If the data received from a sensor meets the data check of phase 2 (and the sensor has passed the sensor health check of phase 1), the sensor is deemed to be trustworthy. The threat protection system may therefore trust the data from the sensor and may begin to collect data from the sensor for use in the learning process is of the threat protection system (i.e., the processes in which the system uses trusted data to identify threats). As noted above, the data collected from the sensor during the sensor checks and data checks of phases one and two may be retained and provided as trusted data if the sensor passes these checks, or this data may be discarded, with trusted data collection beginning after the sensor has completed the sensor health and data checks and been deemed trustworthy.

If the data received from the sensor fails the data check of phase 2, the threat protection system does not, in this embodiment, automatically determined that the sensor is untrustworthy. The sensor may simply have a different and interesting traffic profile that should be included in the analyses of the threat protection system. Consequently, if the sensor data fails the data check of phase 2, the sensor proceeds to phase 3, which comprises a reputation check.

Phase 3 is carried out in this embodiment by the reputation check module 206 of the threat protection system. Reputation check module 206 identifies the source and destination IP addresses reported in the data received from the sensor, and these IP addresses are checked against a reputation list 216 which is maintained by the threat protection system. If reputation check module 206 corroborates that a predetermined percentage of the IP addresses have bad reputations (as determined by the reputation list), then the data is trusted for the current evaluation cycle, as it is consistent with the reputation information maintained by the system. The percentage of IP addresses that need to be corroborated to pass the reputation check is 50% in one embodiment, but this threshold may be configurable and may be different in alternative embodiments.

Figure 4:
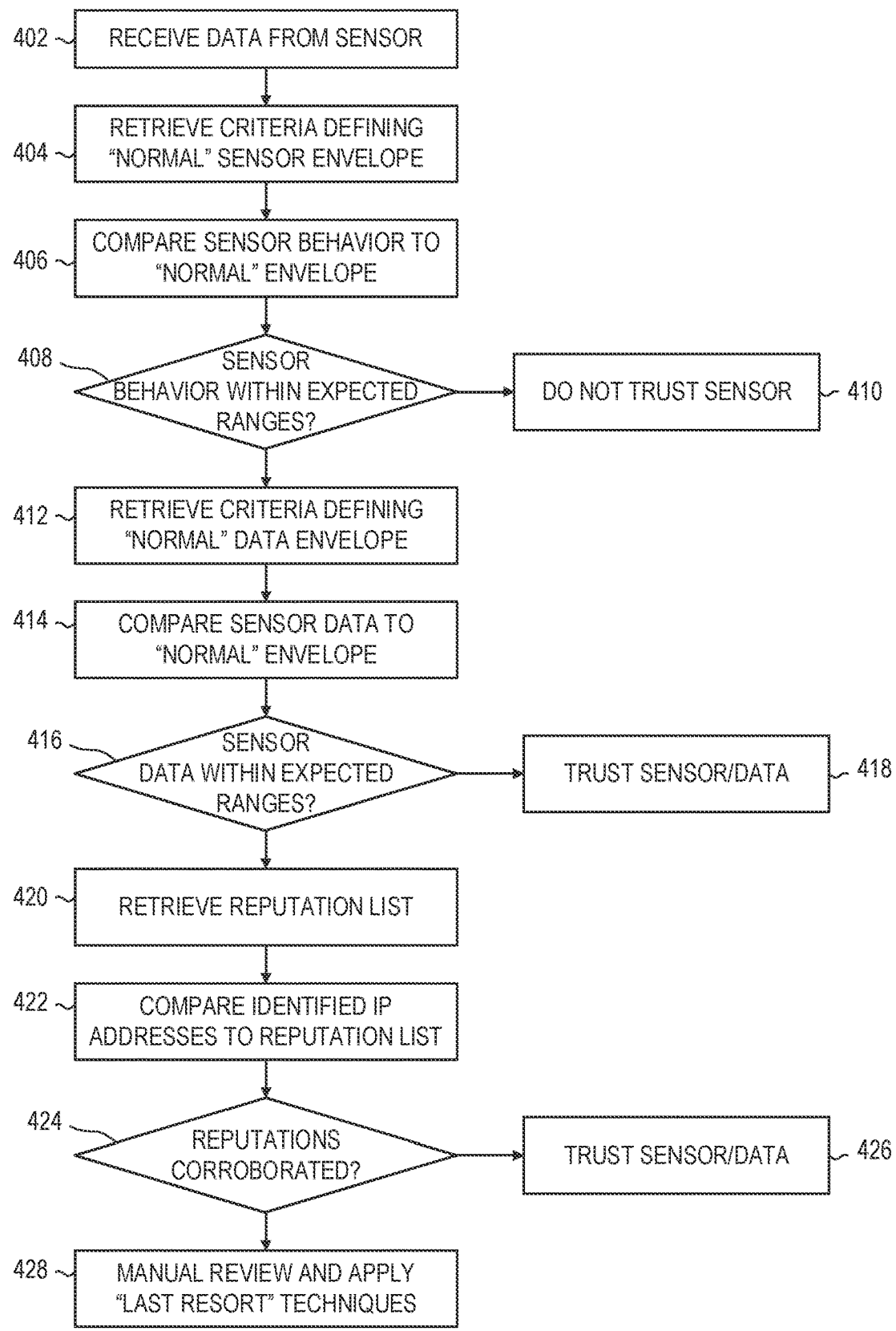
FIG. 4 is a flow diagram illustrating a method for determining the trustworthiness of anonymous sensors in accordance with some embodiments.

The operation of the threat protection system of FIG. 2 is summarized in the flow diagram of FIG. 4. As depicted in this figure, data is first received from a sensor (402). In phase 1, the threat protection system retrieves the criteria defining the "normal" sensor envelope (404) and compares the behavior of the sensor to the retrieved criteria (406). The threat protection system determines whether the behavior of the sensor falls within the expected range is defined by the "normal" envelope (408) and, if the sensor behavior does not fall within the "normal" ranges, the sensor is not trusted (410).

If the threat protection system determines that the sensor behavior does fall within the expected ranges of the "normal" envelope, it proceeds with phase 2 and retrieves the criteria which define a "normal" data envelope (412). The retrieved criteria are compared to the data received from the sensor to determine whether the traffic sensed by the sensor falls within the "normal" criteria (414). If the sensor data falls within the ranges defined by the "normal" envelope (416), the sensor and the data sensed by the sensor are trusted (418).

If the sensor data does not fall within the ranges of the "normal" envelope (416), the threat protection system proceeds with phase 3. In this phase, a reputation list that is maintained by the system is retrieved (420), and the IP addresses which are identified in the sensor data are compared to the reputation list (422) to determine whether the reputation list corroborates the alerts reported by the sensor. If the reputation list corroborates the reputations of the reported IP addresses (424), the sensor and its data can be trusted by the system (426). If the reputations of the identified IP addresses are not corroborated by the reputation list (424), the sensor data may be placed in a queue for review by an analyst (428) who can make a manual determination of whether the sensor and its data are to be trusted.

Figure 5:
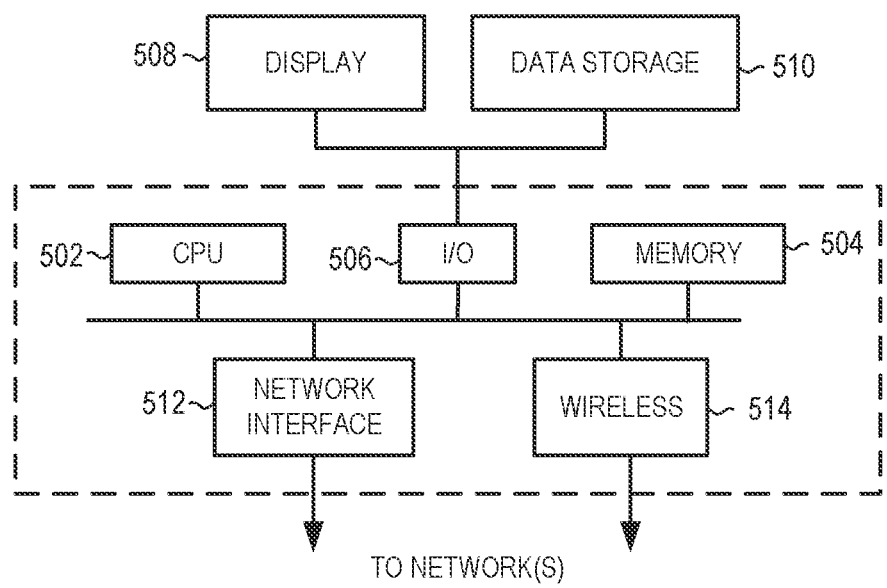
FIG. 5 is a block diagram illustrating an example of a computer structure in which some embodiments disclosed herein can be implemented.

Embodiments discussed herein can be implemented in a computer communicatively coupled to a network (for example, the Internet), another computer, or in a standalone computer. As illustrated in FIG. 5, a suitable computer can include a central processing unit ("CPU" 502), a computer memory (504) such as a read-only memory ("ROM"), random access memory ("RAM") or hard drive ("HD"), and one or more input/output ("I/O") devices 506). The I/O devices, which can be coupled to a display (508) and a data storage device (510), can include a keyboard, monitor, printer, electronic pointing device (for example, mouse, trackball, stylus, touch pad, etc.), or the like. In embodiments of the invention, the computer has a network interface (512) and a wireless component (550214) for communicating with other computing devices over various types of networks.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendix, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendix, the meaning of "in" includes "in" and "on" unless the context clearly dictates otherwise.

It should be understood that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure. It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

What is claimed is:

1. A method for determining sensor trustworthiness comprising:
   receiving sensor data from an anonymous sensor, the sensor data including sensor operating parameters and traffic data, wherein the anonymous sensor cannot be accessed for verification of trustworthiness;
   determining whether the sensor operating parameters fall within a predefined envelope of expected operating parameters;
   in response to determining that the sensor operating parameters fall outside the predefined envelope of expected operating parameters, designating the sensor as an untrusted sensor;
   in response to determining that the sensor operating parameters fall within the predefined envelope of expected operating parameters, determining whether the traffic data of the sensor falls within a predefined envelope of expected traffic data;
   in response to determining that the traffic data of the sensor falls within the predefined envelope of expected traffic data, designating the sensor as a trusted sensor;
   in response to determining that the traffic data of the sensor falls outside the predefined envelope of expected traffic data, comparing a first set of IP addresses in the traffic data to a second set of IP addresses in a reputation list;
   in response to determining that the first set of IP addresses in the traffic data is corroborated by the second set of IP addresses in the reputation list, designating the sensor as a trusted sensor.

2. The method of claim 1, further comprising, in response to determining that the first set of IP addresses in the traffic data is not corroborated by the second set of IP addresses in the reputation list, forwarding the traffic data of the sensor to a user and performing a manual evaluation of the traffic data of the sensor to determine whether the sensor is trustworthy.

3. The method of claim 1, further comprising, in response to determining that the first set of IP addresses in the traffic data is not corroborated by the second set of IP addresses in the reputation list, designating the sensor as an untrusted sensor.

4. The method of claim 1, wherein the first set of IP addresses in the traffic data is corroborated by the second set of IP addresses in the reputation list if at least a predetermined percentage of the first set of IP addresses in the traffic data are included in the second set of IP addresses in the reputation list.

5. The method of claim 1, wherein designating the sensor as an untrusted sensor comprises storing an indication of the sensor in a list of untrusted sensors.

6. The method of claim 1, wherein the method is repeated a plurality of times at designated intervals.

7. The method of claim 1, wherein traffic data received from trusted sensors is forwarded to an analysis system for evaluation, and wherein traffic data received from untrusted sensors is discarded.

8. The method of claim 1, wherein determining whether the sensor operating parameters fall within the predefined envelope of expected operating parameters comprises determining whether software running on the sensor has been updated within a predetermined preceding time period.

9. The method of claim 1, wherein determining whether the sensor operating parameters fall within the predefined envelope of expected operating parameters comprises determining whether at least a predetermined number of telemetry pings have been received from the sensor.

10. The method of claim 1, wherein determining whether the sensor operating parameters fall within the predefined envelope of expected operating parameters comprises determining whether an average time between telemetry pings is no more than a predetermined amount of time.

11. The method of claim 1, wherein determining whether the sensor operating parameters fall within the predefined envelope of expected operating parameters comprises determining whether an average propagation delay for telemetry pings is no more than a predetermined delay.

12. The method of claim 1, wherein determining whether the sensor operating parameters fall within the predefined envelope of expected operating parameters comprises determining whether a network threat detection engine is running on the sensor.

13. The method of claim 1, wherein determining whether the sensor operating parameters fall within the predefined envelope of expected operating parameters comprises determining whether an average volume of sensor data traffic is above a threshold value.

14. The method of claim 1, wherein determining whether the traffic data of the sensor falls within the predefined envelope of expected traffic data comprises determining whether a rate of sensor alerts generated by the sensor per unit of traffic falls within a predetermined range.

15. The method of claim 1, wherein determining whether the traffic data of the sensor falls within the predefined envelope of expected traffic data comprises determining whether a number of IP addresses per unit of traffic falls within a predetermined range.

16. A system comprising:
a processor coupled to a memory that stores one or more instructions, the instructions executable by the processor to perform:
receiving sensor data from an anonymous sensor, the sensor data including sensor operating parameters and traffic data, wherein the anonymous sensor cannot be accessed for verification of trustworthiness;
determining whether the sensor operating parameters fall within a predefined envelope of expected operating parameters;
in response to determining that the sensor operating parameters fall outside the predefined envelope of expected operating parameters, designating the sensor as an untrusted sensor;
in response to determining that the sensor operating parameters fall within the predefined envelope of expected operating parameters, determining whether the traffic data of the sensor falls within a predefined envelope of expected traffic data;
in response to determining that the traffic data of the sensor falls within the predefined envelope of expected traffic data, designating the sensor as a trusted sensor;
in response to determining that the traffic data of the sensor falls outside the predefined envelope of expected traffic data, comparing a first set of IP addresses in the traffic data to a second set of IP addresses in a reputation list;
in response to determining that the first set of IP addresses in the traffic data is corroborated by the second set of IP addresses in the reputation list, designating the sensor as a trusted sensor.

17. The system of claim 16, further comprising, in response to determining that the first set of IP addresses in the traffic data is not corroborated by the second set of IP addresses in the reputation list, forwarding the traffic data of the sensor to a user and performing a manual evaluation of the traffic data of the sensor to determine whether the sensor is trustworthy.

18. The system of claim 16, wherein determining whether the sensor operating parameters fall within the predefined envelope of expected operating parameters comprises one or more of: determining whether software running on the sensor has been updated within a predetermined preceding time period; determining whether at least a predetermined number of telemetry pings have been received from the sensor; determining whether an average time between telemetry pings is no more than a predetermined amount of time; determining whether an average propagation delay for telemetry pings is no more than a predetermined delay; determining whether a network threat detection engine is running on the sensor; and determining whether an average volume of sensor data traffic is above a threshold value.

19. The system of claim 16, wherein determining whether the traffic data of the sensor falls within the predefined envelope of expected traffic data comprises one or more of: determining whether a rate of sensor alerts generated by the sensor per unit of traffic falls within a predetermined range; and determining whether a number of IP addresses per unit of traffic falls within a predetermined range.

20. A computer program product comprising a non-transitory computer-readable medium storing instructions executable by one or more processors to perform:
receiving sensor data from an anonymous sensor, the sensor data including sensor operating parameters and traffic data, wherein the anonymous sensor cannot be accessed for verification of trustworthiness;
determining whether the sensor operating parameters fall within a predefined envelope of expected operating parameters;
in response to determining that the sensor operating parameters fall outside the predefined envelope of expected operating parameters, designating the sensor as an untrusted sensor;
in response to determining that the sensor operating parameters fall within the predefined envelope of expected operating parameters, determining whether the traffic data of the sensor falls within a predefined envelope of expected traffic data;

in response to determining that the traffic data of the sensor falls within the predefined envelope of expected traffic data, designating the sensor as a trusted sensor;

in response to determining that the traffic data of the sensor falls outside the predefined envelope of expected traffic data, comparing a first set of IP addresses in the traffic data to a second set of IP addresses in a reputation list;

in response to determining that the first set of IP addresses in the traffic data is corroborated by the second set of IP addresses in the reputation list, designating the sensor as a trusted sensor.

* * * * *